United States Patent [19]

Bessacini et al.

[11] Patent Number: 5,436,832
[45] Date of Patent: Jul. 25, 1995

[54] FUZZY CONTROLLER FOR BEAM RIDER GUIDANCE

[75] Inventors: Anthony F. Bessacini, Narragansett; Robert F. Pinkos, Saunderstown, both of R.I.

[73] Assignee: The United States of America as represented by the Secretary of the Navy, Washington, D.C.

[21] Appl. No.: 147,271

[22] Filed: Nov. 5, 1993

[51] Int. Cl.⁶ ............................................. G06F 165/00
[52] U.S. Cl. .................. 364/424.02; 364/423; 364/516; 395/905; 244/3.13
[58] Field of Search .............. 364/424.01, 424.02, 364/423, 444, 462, 516; 395/3, 900, 905; 342/61, 62; 318/589; 244/3.11, 3.12, 3.13; 114/21.1, 21.2; 89/1.809, 5

[56] References Cited

U.S. PATENT DOCUMENTS

| | | | |
|---|---|---|---|
| 4,220,296 | 9/1980 | Hesse | 244/3.14 |
| 4,860,968 | 8/1989 | Pinson | 244/3.14 |
| 5,012,717 | 5/1991 | Metersky et al. | 39/1.11 |
| 5,285,380 | 2/1994 | Payton | 364/174 |
| 5,319,556 | 6/1994 | Bessacini | 364/424.01 |

*Primary Examiner*—Michael Zanelli
*Attorney, Agent, or Firm*—Michael J. McGowan; Prithvi C. Lall; Oglo: Michael F.

[57] ABSTRACT

A beam rider guidance system for directing a steerable object, such as a torpedo. The guidance system senses the bearing between a first site and a second site and determines the bearing between the first site and the steerable object as it moves toward the second site. Various error signals are then generated and classified into sensed linguistic variables based on membership functions of different sensed variable membership function sets to become fuzzy inputs to a controller that produces fuzzy control output linguistic variables and associated membership functions from a control output membership function set based upon logical manipulation of the fuzzy inputs. These fuzzy control output membership functions are converted into an output having an appropriate form for control, subject to optional constraint to prevent unwanted effects.

34 Claims, 12 Drawing Sheets

$e_{gp}$

|  | NL | NM | NS | ZE | PS | PM | PL |
|---|---|---|---|---|---|---|---|
| NL | PL | PL | PL | PS | ZE | NM | NL |
| NS | PL | PM | PS | ZE | NS | NM | NL |
| ZE | PL | PM | PS | ZE | NS | NM | NL |
| PS | PL | PM | PS | NS | NM | NL | NL |
| PL | PL | PS | ZE | NS | NL | NL | NL |

$\Delta e_v$ (row labels)

|  | NL | NM | NS | ZE | PS | PM | PL |
|---|---|---|---|---|---|---|---|
| NL | PL | PM | ZE | NS | NL | NL | NL |
| NS | PL | PM | PS | ZE | NS | NM | NL |
| ZE | PL | PM | PS | ZE | NS | NM | NL |
| PS | PL | PL | PM | PS | NS | NM | NL |
| PL | PL | PL | PL | PS | ZE | NS | NL |

$\Delta e_v$ (row labels)

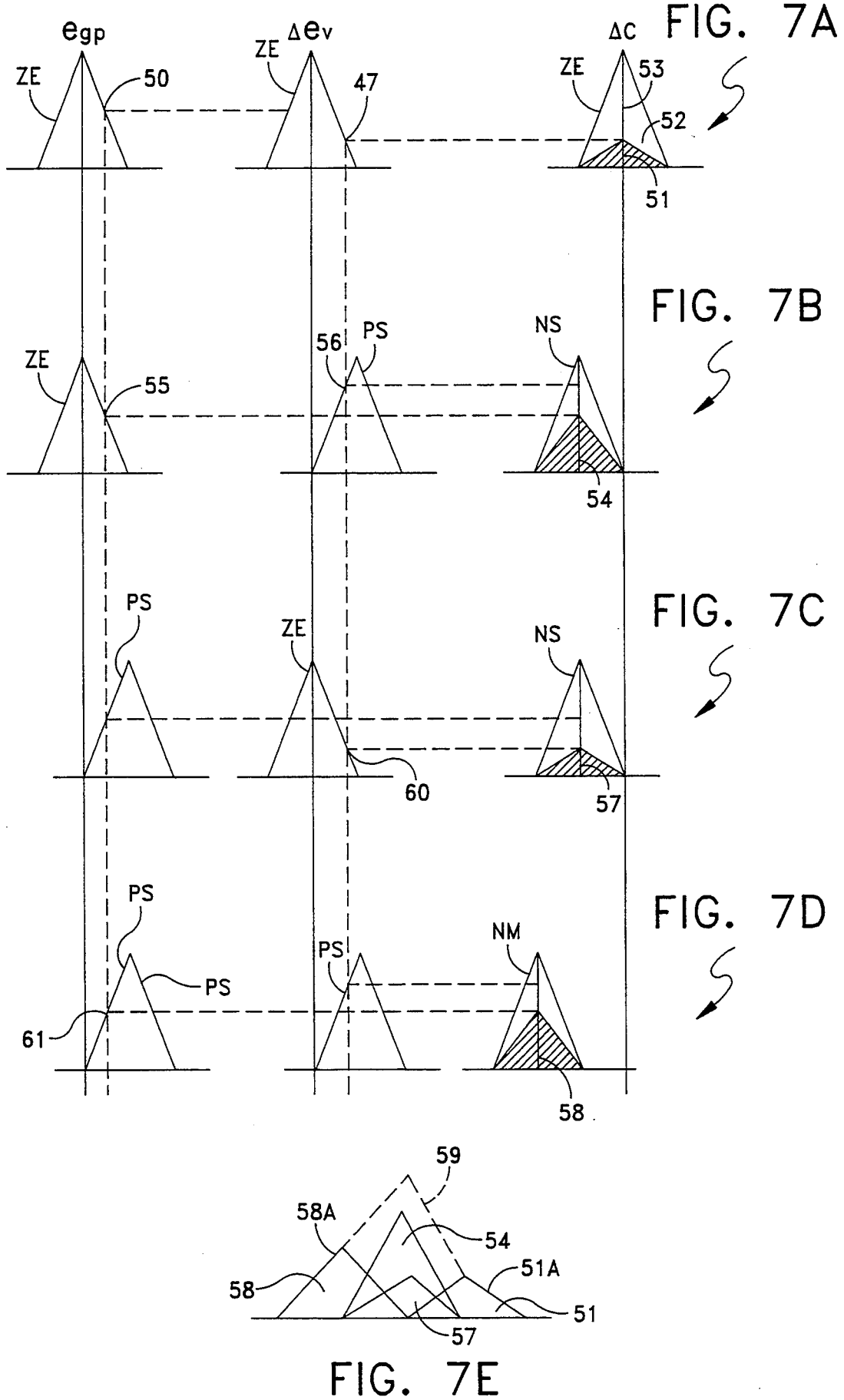

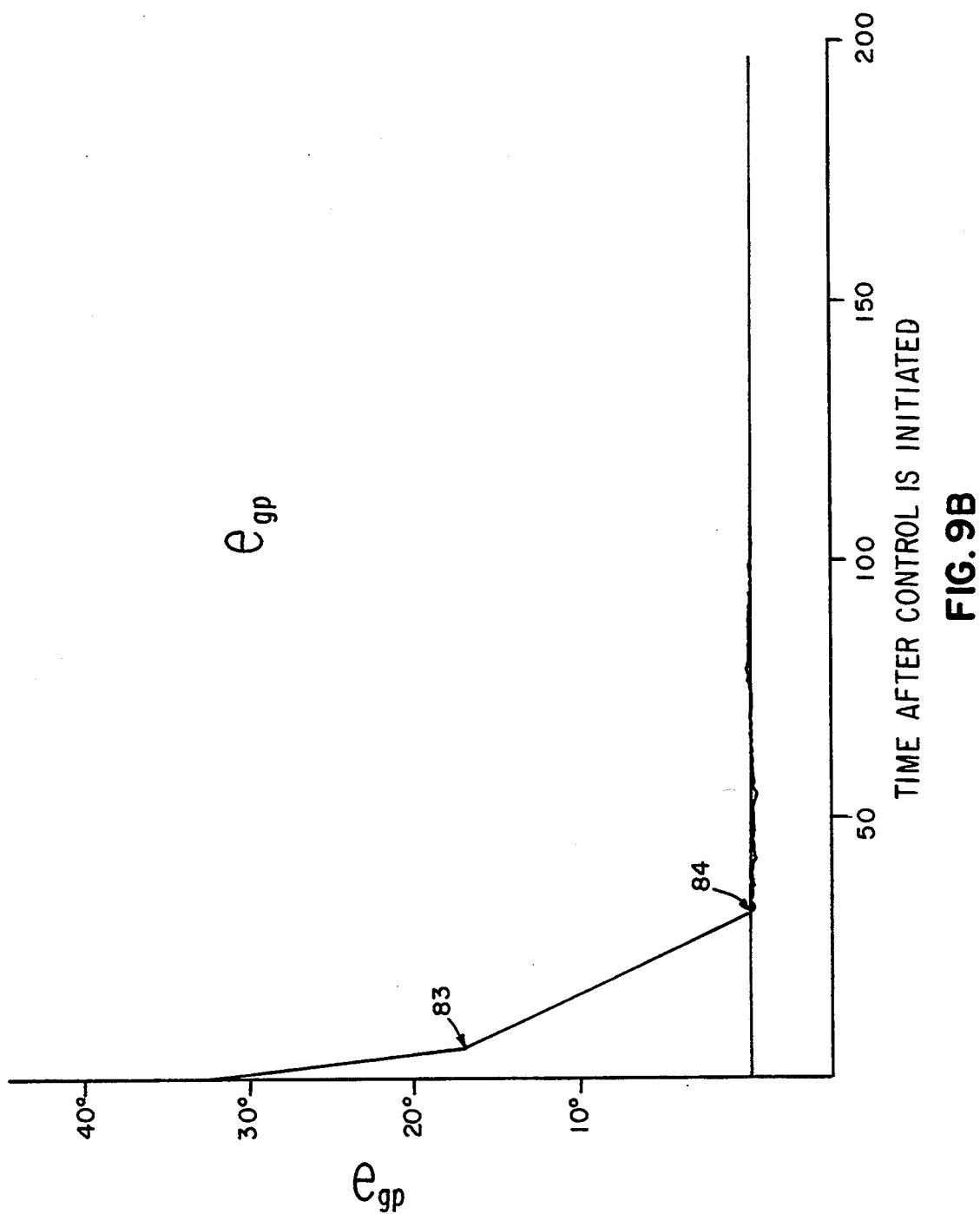

FUZZY CONTROLLER FOR BEAM RIDER GUIDANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention generally relates to a control system located at a first site for guiding a steerable object from that site toward a second site. More specifically this invention relates to such a control system that is operable even when both the first and second sites undergo independent motion.

2. Description of the Prior Art

Submarines include a control system for guiding an acoustic homing torpedo launched from the submarine toward a target. In this particular application, the torpedo constitutes a steerable object while the submarine and target constitute first and second sites, respectively, that are capable of undergoing independent motion. The control system used in this application is oftentimes a "beam rider" control system at the submarine, or first site, that guides a torpedo toward the target, as the second site, along a bearing line to the second site, particularly when the range to the target is not known.

Beam rider control systems generally operate with steerable objects characterized by some internal homing or equivalent steering control system. In the case of a submarine launched torpedo, the beam rider control system directs a torpedo with an acoustic homing system toward the target. When the torpedo comes within the effective range of the homing system, the homing system takes over the steering control function. Steerable objects with such homing systems are also characterized by having an external point in front of the steerable object called a "guidance point". This guidance point corresponds to the centroid of the acoustic beam in the case of a torpedo with an acoustic homing device. Generally a beam rider control system operates to maintain the guidance point of a steerable object, such as a torpedo, on a bearing line from the first site to the second site.

Prior art beam riding control systems for submarine launched torpedoes include a control mechanism, a torpedo model and a communications link to the torpedo, as the steerable object. The torpedo model is a mathematical replica of the torpedo that provides position and status information for post launch guidance operation. The control mechanism utilizes measured contact information, particularly a bearing from the submarine to the target, and torpedo model information, particularly the bearing from the submarine to the guidance point of the torpedo, to generate a command sequence for maintaining the guidance point on a trajectory to the target. These commands are transferred from the submarine to the torpedo through a wire communications link.

Present beam rider control systems do not include any mechanism for readily allowing the inclusion of heuristic information into the control system, particularly information about expertise gained through past experience with manual beam rider guidance systems. Also present beam rider control systems normally require an operator to determine whether to issue a particular command to a torpedo. Present systems do not automatically generate and issue guidance commands in a continuous fashion.

Other approaches for directing a steerable object from a launch site to a target involve complicated control systems based on sets of differential equations and estimates of input parameters. Such systems operate in response to analytical controllers. However, like prior art beam rider control systems such analytical controllers are not readily adapted to utilize expert knowledge gained through experience.

U.S. Pat. No. 5,101,351 depicts an alternative control system, known as a "fuzzy control" system for use in steering a vehicle. In this system a camera forms an image of the road. An image processor uses the image to calculate the deviation between a plurality of reference points on a road and the direction in which the vehicle is traveling. Each reference point is associated with a plurality of visual points spaced along the road at predetermined distances ahead of the vehicle. The control determines the product of the deviation for each visual point and a membership function indicating the degree of importance attached to each visual point. The membership functions are varied in accordance with the time rate of change of the deviations. The control also calculates a total deviation equal to the sum of the products, and this total deviation is the basis for steering control.

Several features of the control system in U.S. Pat. No. 5,101,351 are antithetical in applications such as submarine launched torpedo guidance applications. The entire control system disclosed in the patent is located on a vehicle used as a steerable object; in a submarine application, the control system must be located on the submarine remotely from the torpedo as a steerable object. Moreover in a submarine application, both the submarine and target usually undergo motion relative to each other and relative to the torpedo. The system disclosed in the patent monitors only a fixed line on a road so it only needs to respond to deviations in the direction of vehicle travel relative to the reference line. Finally, the fuzzy control system described in the patent selects control rules on the basis of one set of related parameters, namely deviation and a derived rate of change of deviation that is modified by vehicle speed. Such a system uses a single set of control rules derived from a single input; in a submarine application the system control rules are derived from two inputs. The first input pertains to the vehicle guidance point. The second input pertains to the vehicle. Consequently a system based upon U.S. Pat. No. 5,101,351 will not work well in a submarine environment.

SUMMARY OF THE INVENTION

Therefore it is an object of this invention to provide an improved beam rider guidance system at a first site for guiding an object as it moves from the first site toward a second site.

Another object of this invention is to provide a guidance system using fuzzy control that operates from a first site for guiding an object from the first site toward a second site wherein both the first site and second site can undergo independent motion.

Yet another object of this invention is to provide a guidance system using a fuzzy controller for maintaining a guidance point on a beam rider trajectory through control of the steerable object.

Still another object of this invention is to provide a guidance system including fuzzy control for steering a torpedo from a submarine toward a target.

Yet still another object of this invention is to provide a guidance system with fuzzy control for use with submarine launched torpedoes that can be adapted for use in a variety of situations.

Still yet another object of this invention is to provide a guidance system for submarine launched torpedoes that can operate automatically and can readily accommodate diverse operating circumstances.

In accordance with this invention, a guidance system located at a first site communicates with a steerable object over a communications link and guides the steerable object from the first site toward a second site. The guidance system operates iteratively and during each iteration determines a set of bearings from the first site to the steerable object and from the first site to the second site. Each set of sensed bearings is classified into first and second sensed linguistic variables that are combined to select one or more control output linguistic variables according to a set of logical guidance rules. The selected control output linguistic variables generate a guidance command based upon associated control output membership functions for transfer over the communications link to control the steerable object.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 6A and 6B represent rule based matrices incorporated in the rule based unit of FIG. 5;

FIGS. 7A through 7E depict the operation of the rule based unit shown in FIGS. 2 and 5;

FIGS. 9A, 9B and 9C depict the operation of the guidance system shown in FIG. 2.

DESCRIPTION OF THE PREFERRED EMBODIMENT

Figure 1:
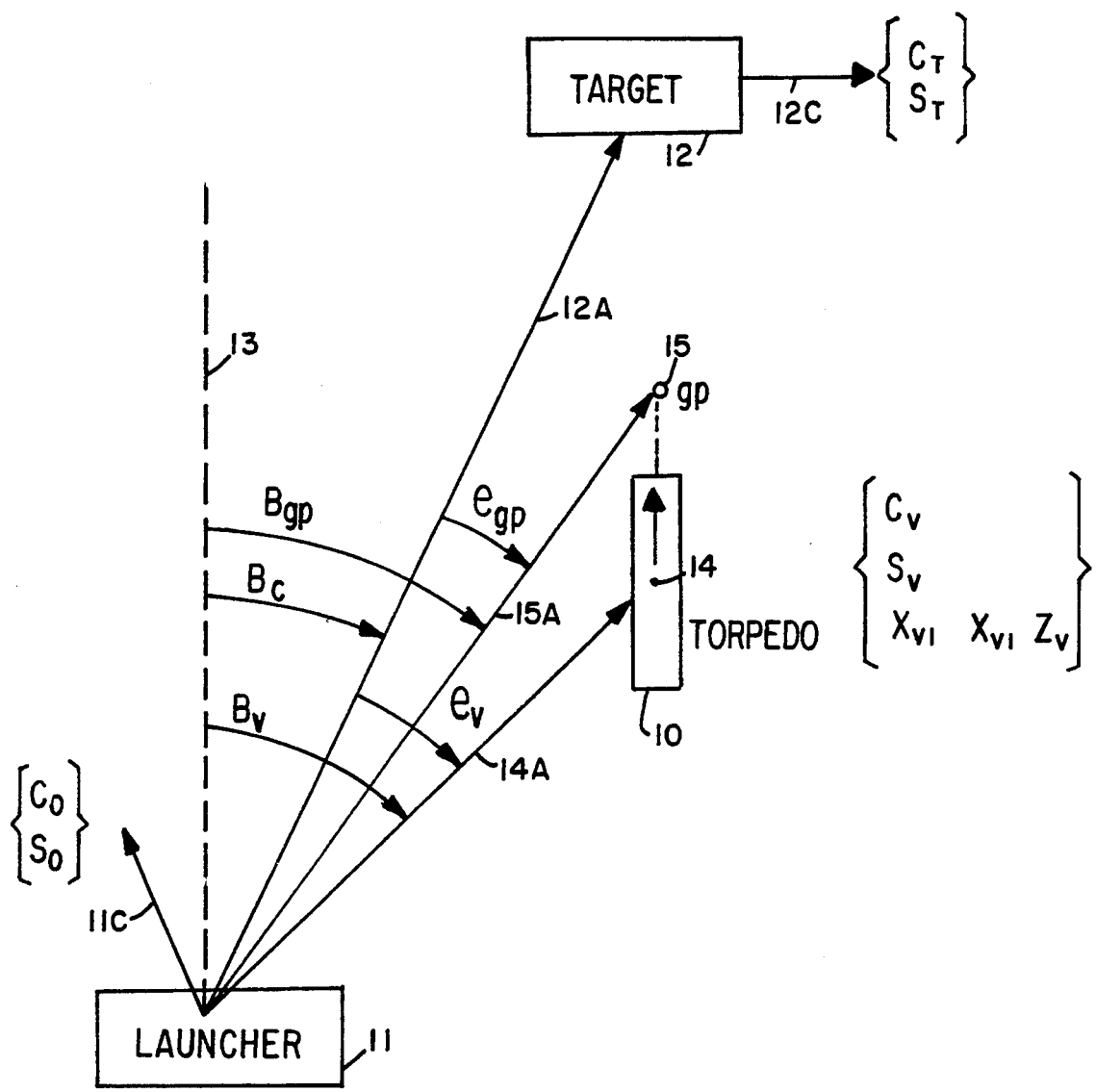
FIG. 1 depicts various relationships among a first site, a second site and a steerable object that are useful in understanding this invention.

FIG. 1 depicts a torpedo 10, as an example of a steerable object, that is moving from a first site, shown as a launcher 11, toward a second site, shown as a target 12. The torpedo 10 has a position ($X_V$, $Y_V$ and $Z_V$), a course ($C_V$) and a speed ($S_V$). The launcher 11 is moving along a course $C_o$ and at speed $S_o$ as represented by an arrow 11C while the target is moving along an arbitrary course $C_T$ at an arbitrary speed $S_T$, both of which are unknown and represented by an arrow 12C. Each of these course lines 11C and 12C are normally measured with respect to some reference shown by a dashed line 13 in FIG. 1, typically magnetic north.

If the torpedo 10 has a homing apparatus, such as an acoustic homing apparatus, the guidance system uses two bearing angles associated with the torpedo 10. One is a bearing to a center point 14 of the torpedo 10; the other, a bearing to a guidance point (gp) 15. As previously indicated, the guidance point 15 can correspond to the centroid of the acoustic beam of the internal acoustic homing apparatus.

Figure 2:
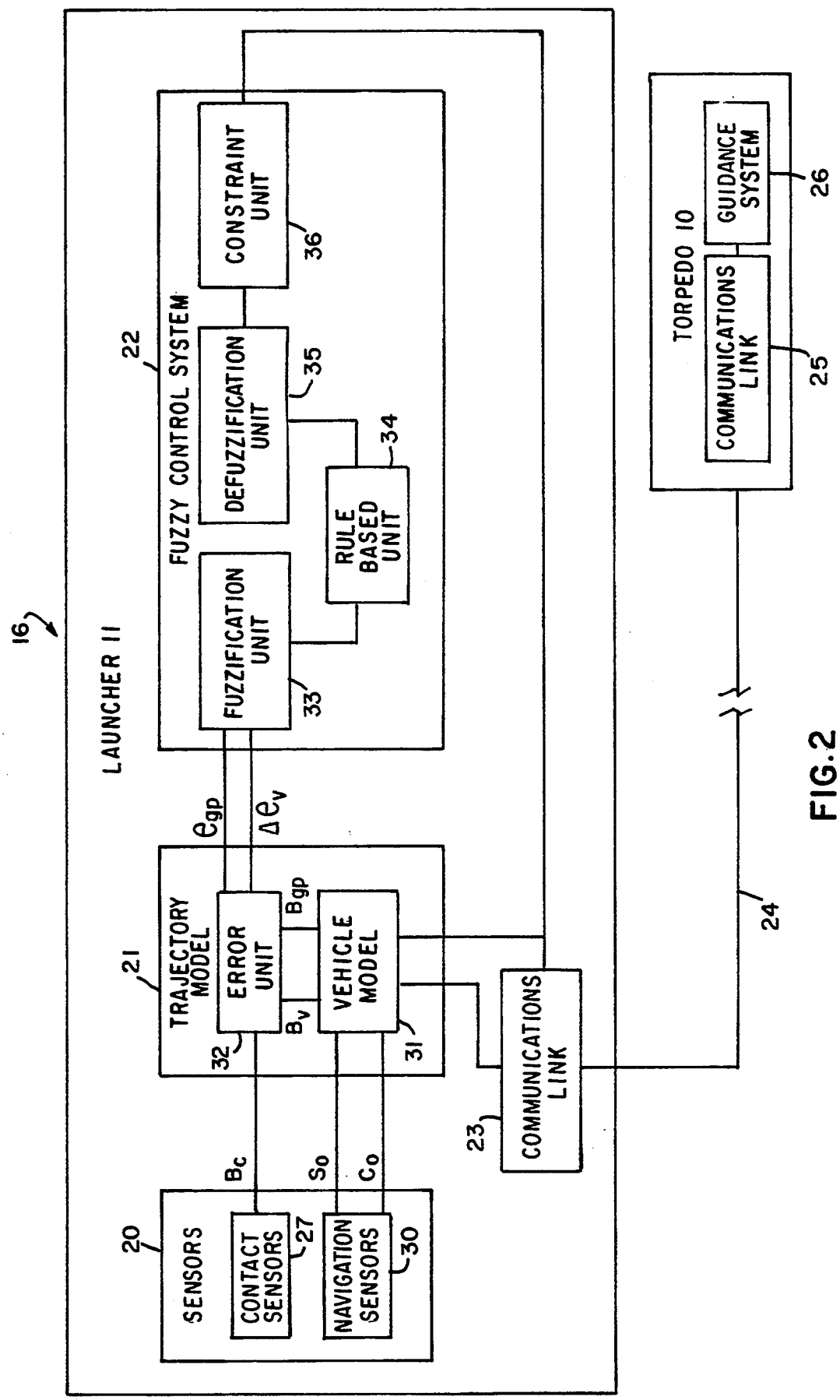
FIG. 2 is a block diagram of a guidance system constructed and operated in accordance with this invention.

Referring now to FIG. 2, a guidance system 16 constructed in accordance with this invention includes sensors 20 that measure various parameters associated with the target 12 and the launcher 11. A trajectory model 21 processes data from the sensors 20 and generates a set of error functions for a fuzzy control system 22 that classifies each of the error functions (as first and second sensed variables) into one or more sensed linguistic variables from a corresponding set of predetermined sensed linguistic variables based upon their associated sensed variable membership functions. This control system 22 logically combines the selected ones of the first and second sensed linguistic variables for identifying one or more control output linguistic variables and corresponding control output membership functions from a control output membership function set. The control system 22 also converts the selected control output membership function or functions into a guidance command. A communications link 23 transfers the guidance command over a bidirectional communications channel 24, typically formed by a wire connected to the torpedo 10, to another communications link 25 and a guidance system 26 in the torpedo 10. Information from the torpedo 10 also transfers through the communication link 23 to the trajectory model 21.

Figure 3A:
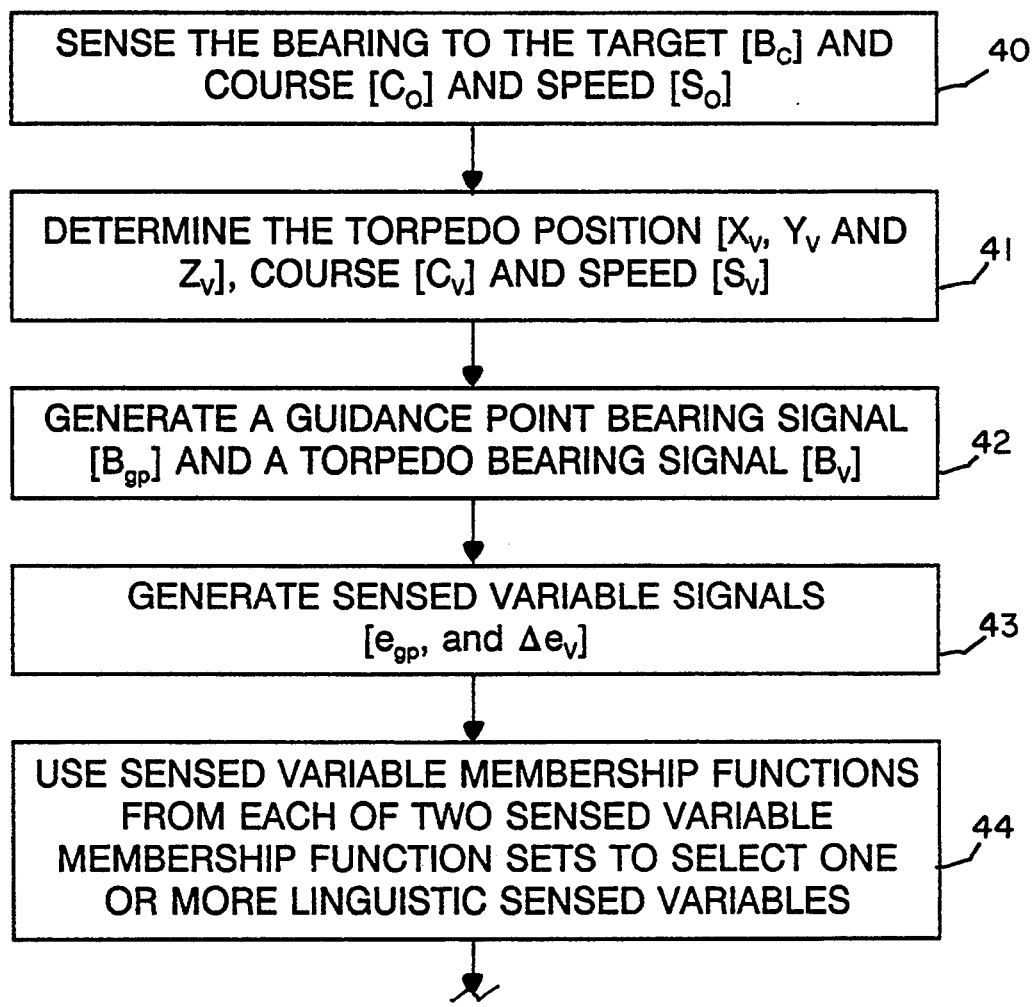
FIGS. 3A and 3B constitute a flow diagram that depicts the operation of the guidance system in FIG. 2.

Referring to FIGS. 1 and 2, the sensors 20 include contact sensors 27 that produce a bearing $B_C$ defined by the angle between the reference 13 and a line 12A to the target 12. As shown in FIG. 3A, this activity occurs during step 40. Navigation sensors 30 of FIG. 2 simultaneously produce the course $C_o$ and speed $S_o$ of the launcher 11. In step 41 (FIG. 3A) a vehicle model 31 (FIG. 2) provides the position ($X_V$, $Y_V$ and $Z_V$), course ($C_V$) and speed ($S_V$) of the torpedo 10. This information can be obtained utilizing information supplied by the navigation sensors 30 and open loop or dead reckoning updates to the vehicle model 31 or supplemented with information from the torpedo 10.

Whatever the inputs, the vehicle model 31 produces two signals for an error unit 32. One is a $B_V$ signal that represents the bearing relationship defined by the angle between the reference line 13 in FIG. 1 and a line 14A from the launcher 11 to the center point 14 of the torpedo 10. The second is a $B_{gp}$ signal that represents the bearing defined by the angle between the reference line 13 and a line 15A from the launcher 11 to the guidance point 15 of the torpedo 10. This occurs during step 42 in FIG. 3A.

For purposes of this explanation, it will be assumed that the fuzzy control system 22 is designed to operate over bearing ranges $-90° \leq B_V \leq 90°$ and $-90° \leq B_c \leq 90°$. In the guidance system 16, an error unit 32 produces an $e_{gp}$ error signal that represents a sensed variable corresponding to the instantaneous deviation between the target bearing $B_C$ and the guidance point bearing $B_{gp}$. The error unit 32 also produces an $\Delta e_\gamma$ signal that represents another sensed variable corresponding to the rate of change of error signal. More specifically, the error unit 32 uses a deviation signal, $e_\gamma$, between the bearings $B_C$ and $B_\gamma$ to develop this rate of change error signal. If the guidance system 16 in FIG. 2 repeats the operation once per second, the difference between $|e_{\gamma(k)}|$ and $|e_{\gamma(k-1)}|$ determines the rate at which the error angle $e_\gamma$ changes in degrees per second.

More specifically, during step 43 of each iteration of FIG. 3A the error unit 32 in FIG. 2 converts the incoming signals into error signals representing the sensed variables as follows:

$$e_{gp} = B_{gp} - B_C \quad (1)$$

and $$\Delta e_\gamma = |B_\gamma - B_C|_k - |B_\gamma - B_C|_{k-1} \quad (2)$$

Figure 4A:
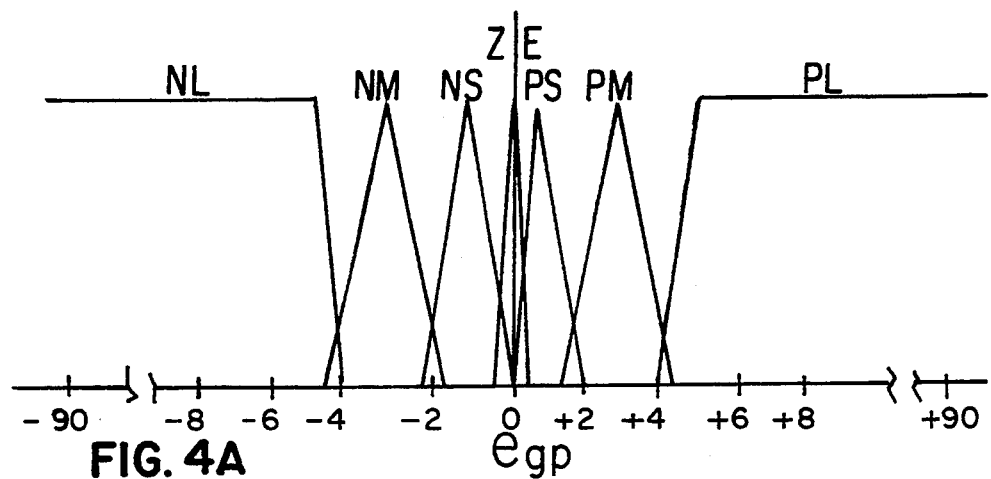
FIGS. 4A, 4B and 4C are graphical representations of linguistic variables and their associated membership function sets that are useful understanding in this invention.

Step 44 in FIG. 3A represents a procedure by which the control system 22 of FIG. 2 encodes each of the error signals representing the sensed variables into one or more corresponding sensed linguistic variables based upon sensed variable membership functions from corresponding sensed variable membership function sets. FIG. 4A, for example, discloses an $e_{gp}$ sensed variable membership function set with seven sensed variable membership functions and their corresponding sensed $e_{gp}$, or "bearing error" linguistic variables while FIG. 4B discloses an $\Delta e_\gamma$ sensed variable membership function set with five $\Delta e_\gamma$ sensed variable membership functions and their corresponding sensed $\Delta e_\gamma$, or "error rate" linguistic variables.

Figure 4B:
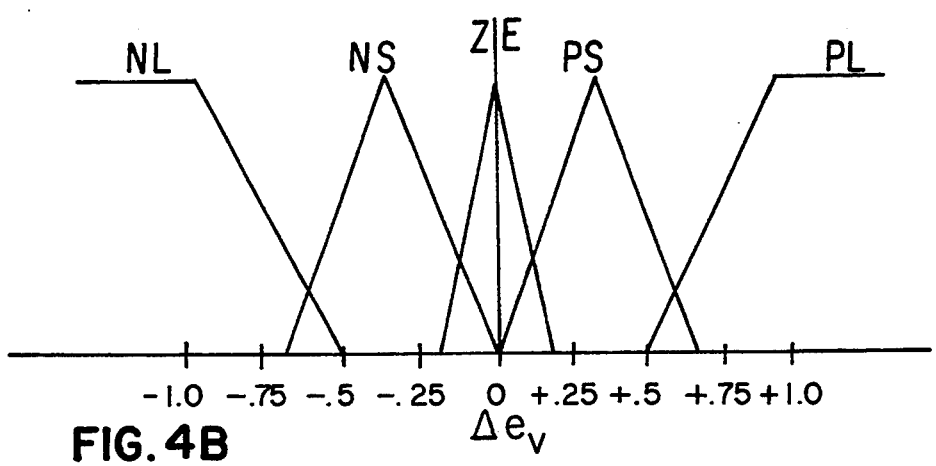

Assuming that the following relationships exist $$x1 = e_{gp} \quad (3)$$

and $$x2 = \Delta e_\gamma \quad (4)$$

a fuzzification unit 33 in FIG. 2 uses the $e_{gp}$ signals to select one or more of the seven available $e_{gp}$ sensed bearing error linguistic variables and the $\Delta e_\gamma$ signal to select one or more of five available sensed error rate linguistic variables. The possibilities in this particular embodiment, that includes the "bearing error" and "error rate" linguistic variables $T_{x1}$ and $T_{x2}$ respectively, can be designated as:

$$\begin{aligned} T(x1) &= (T^1_{X1}, T^2_{x1}, T^3_{x1}, T^4_{x1}, T^5_{x1}, T^6_{x1}, T^7_{x1}) \\ &= (NL, NM, NS, ZE, PS, PM, PL) \end{aligned} \quad (5)$$

and $$\begin{aligned} T(x2) &= (T^1_{X2}, T^2_{x2}, T^3_{x2}, T^4_{x2}, T^5_{x2}) \\ &= (NL, NS, ZE, PS, PL) \end{aligned} \quad (6)$$

where "NL" denotes a Negative Large sensed linguistic variable; "NS", a Negative Small sensed linguistic variable; "NM", a Negative Medium sensed linguistic variable; "ZE", a Zero sensed linguistic variable; "PS", a Positive Small sensed linguistic variable; "PM", a Positive Medium sensed linguistic variable; and "PL", a Positive Large sensed linguistic variable. The specific set of membership functions $\mu(x1)$ and $\mu(x2)$ corresponding to inputs x1 and x2 and the sensed bearing error and error rate linguistic variables as shown in FIGS. 4A and 4B, can be mathematically stated as follows:

$$\mu(x1) = (\mu^1_{x1}, \mu^2_{x1}, \mu^3_{x1}, \mu^4_{x1}, \mu^5_{x1}, \mu^6_{x1}, \mu^7_{x1}) \quad (7)$$

and $$\mu(x2) = (\mu^1_{x2}, \mu^2_{x2}, \mu^3_{x2}, \mu^4_{x2}, \mu^5_{x2}). \quad (8)$$

For j=1 and i=2,3,4,5,6 and for j=2 and i=2,3,4

$$\mu^i_{xj} = \frac{-(|xj - C^i_{xj}|)}{\delta^i_{xj}} + 1 \quad (9)$$

for $$C^i_{xj} - \delta^i_{xj} \leq xj \leq C^i_{xj} + \delta^i_{xj} \quad (10)$$

and $$\mu^i_{xj} = 0 \quad (11)$$

for $$C^i_{xj} - \delta^i_{xj} > xj > C^i_{xj} + \delta^i_{xj} \quad (12)$$

The end conditions, j=1 and i=1,7 and j=2 and i=1,5 are defined by the following equations:

$$\mu^i_{xj} = \frac{-(|xj - C^i_{xj}|)}{\delta^i_{xj}} + 1 \quad (13)$$

for $$a^i C^i_{xj} \geq a^i xj \geq a^i(C^i_{xj} - a^i \delta^i_{xj}) \quad (14)$$

and $$\mu^i_{xj} = 1 \quad (15)$$

for $$a^i C^i_{xj} < a^i xj \quad (16)$$

and $$\mu^i_{xj} = 0 \quad (17)$$

for $$a^i(C^1_{xj} - a^i \delta^i_{xj}) > a^i xj \quad (18)$$

where $a^i = 1$, except for i=1 where $a^1 = -1$.

FIG. 4A depicts graphically the relationship of each sensed bearing error linguistic variable and associated membership function in the $e_{gp}$ membership function set for different values of the $e_{gp}$ signal according to a specific set of values for $C^i_{xj}$ and $\delta^i_{xj}$. FIG. 4B presents analogous information for the $\Delta e_\gamma$ signal. In the specific embodiment shown in FIGS. 4A and 4B certain incoming signals correspond to a single or multiple sensed bearing error and sensed error rate linguistic variables based upon corresponding membership functions. For example, in FIG. 4A the $e_{gp}$ membership function set is used to encode an $e_{gp}$ signal having a value 0 only into a ZE linguistic sensed bearing error variable whereas a value of slightly less than +2 is encoded into both PS and PM sensed bearing error linguistic variables by using the $e_{gp}$ membership function set. Likewise the error rate membership set in FIG. 4B is used to encode a signal $\Delta e_V = 1.0$ into a PL sensed error rate linguistic variable and a signal $\Delta e_v = 0.1$ into both ZE and PS sensed error rate linguistic variables.

Figure 3B:
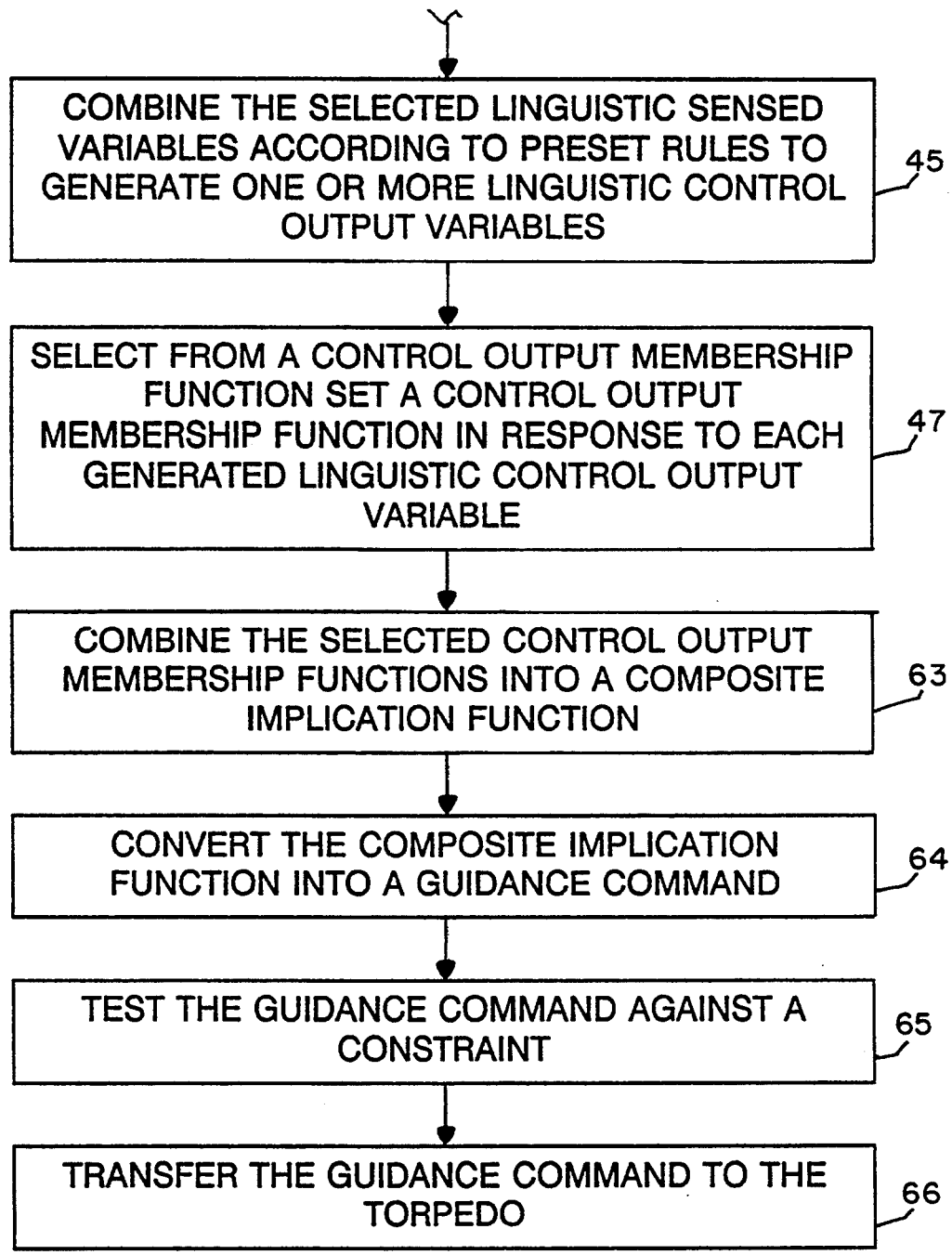
Figure 4C:
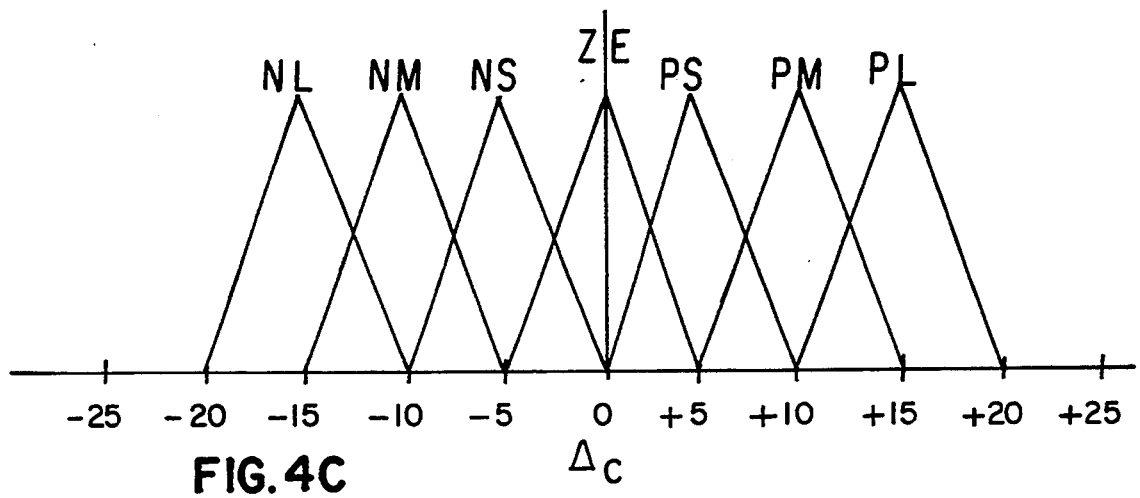
Figure 5:
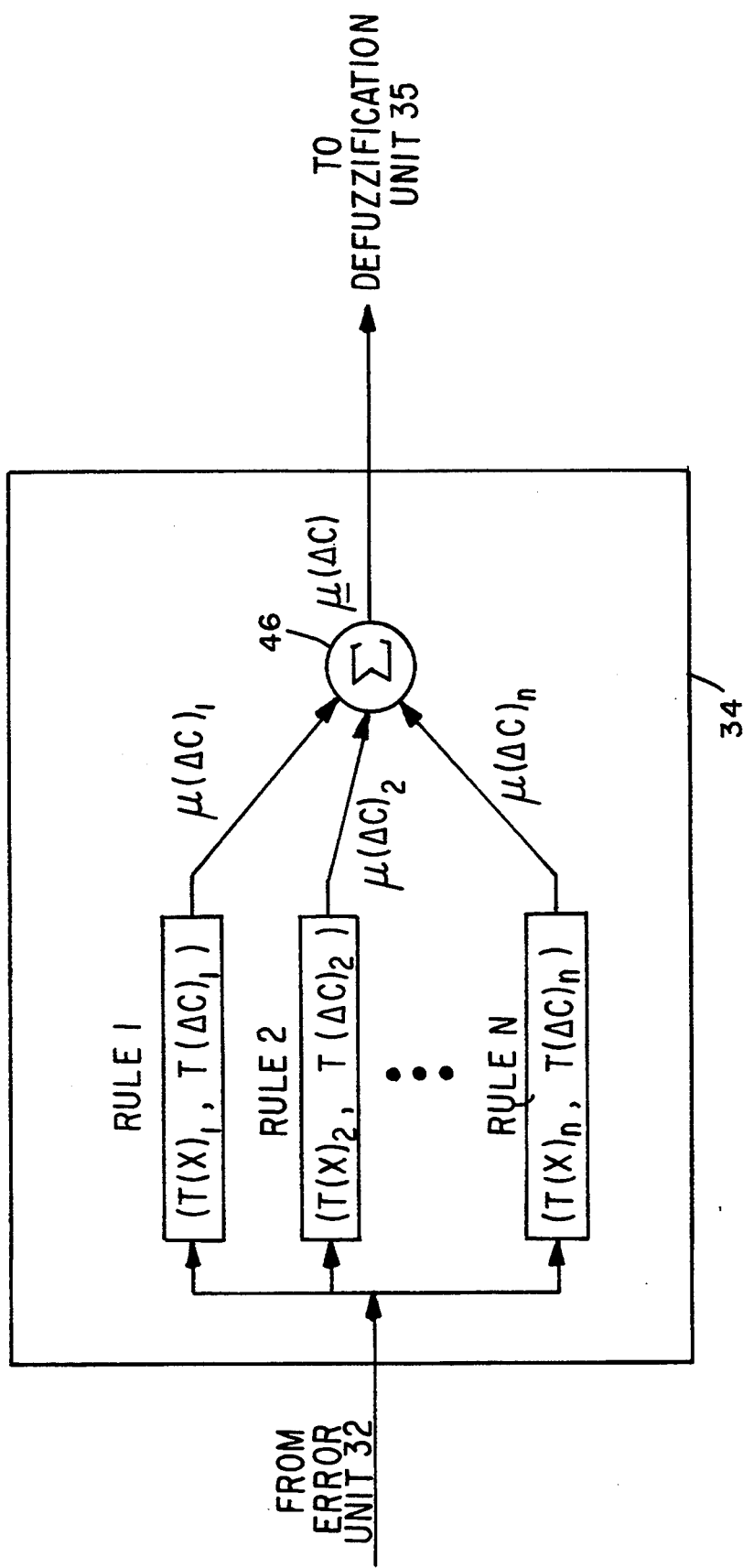
FIG. 5 schematically represents a rule based unit shown in FIG. 2.

Referring to step 45 in FIG. 3B, the rule based unit 34 in FIGS. 2 and 5 combines the selected sensed bearing error and error rate linguistic variables to produce one or more control output linguistic variables. Each selected control output linguistic variable corresponds to a predefined membership function in a control output membership function set (FIG. 4C). More specifically, each control output linguistic variable is determined according to a set of rules defined in FIG. 6A and 6B. The control outputs include, in this specific embodiment, seven control output linguistic variables defined as:

$$T(\Delta C) = (T^1_{\Delta C}, T^2_{\Delta C}, T^3_{\Delta C}, T^4_{\Delta C}, T^5_{\Delta C}, T^6_{\Delta C}, T^7_{\Delta C}) \quad (19)$$
$$= (NL, NM, NS, ZE, PS, PM, PL).$$

The corresponding control output membership functions are shown in FIG. 4C and can be defined, for $i = 1,2,3,4,5,6,7$ by $$\mu^i_{\Delta C} = \frac{-(|\Delta C - C^i_{\Delta C}|)}{\delta^i_{\Delta C}} + 1 \quad (20)$$

for $$C^i_{\Delta C} - \delta^i_{\Delta C} \leq \Delta C \leq C^i_{\Delta C} + \delta^i_{\Delta C} \quad (21)$$

and by $$\mu^i_{\Delta C} = 0 \quad (22)$$

for $$C^i_{\Delta C} - \delta^i_{\Delta C} > \Delta C > C^i_{\Delta C} + \delta^i_{\Delta C} \quad (23)$$

Values for the various constants $C^i$ and $\delta^i$ are associated with different membership functions of the sensed variable and control output variable membership function sets. If $\mu(x1)$ and $\mu(x2)$ represent the sensed variable membership function sets and $\mu(\Delta C)$ represents the output control membership function set, the following table provides some specific examples:

| | $\mu(x1)$ | | $\mu(x2)$ | | $\mu(\Delta C)$ | |
|---|---|---|---|---|---|---|
| i | $C^i_{x1}$ | $\delta^i_{x1}$ | $C^1_{x2}$ | $\delta^i_{x2}$ | $C^i_{\Delta C}$ | $\delta^i_{\Delta C}$ |
| 1 | −5.0 | 1.0 | −0.95 | 0.45 | −15.0 | 5.0 |
| 2 | −3.0 | 1.5 | −0.3375 | 0.3375 | −10.0 | 5.0 |
| 3 | −1.0 | 1.0 | 0.0 | 0.1875 | −5.0 | 5.0 |
| 4 | 0.0 | 0.4 | 0.3375 | 0.3375 | 0.0 | 5.0 |
| 5 | 1.0 | 1.0 | 0.95 | 0.45 | 5.0 | 5.0 |
| 6 | 3.0 | 1.5 | | | 10.0 | 5.0 |
| 7 | 5.0 | 1.0 | | | 15.0 | 5.0 |

The rule base unit 34 of FIG. 2 operates according to a series of rules defined in terms of different combinations of the sensed bearing error and error rate linguistic variables. For example, if the fuzzification unit classifies both the $e_{gp}$ and $\Delta e_V$ signals as Negative Large (NL) sensed linguistic variables, the rule based unit 34 will generate a positive large (PL) control output linguistic variable. FIGS. 6A and 6B depict the control output linguistic variable membership rules in matrix form with FIG. 6A being applied for positive values of the difference $(B_V - B_C)$ and FIG. 6B for negative values of the difference $(B_V - B_C)$.

The rule base unit 34 in FIG. 5 utilizes all the possible combinations for a given set of readings to produce an output based upon the selection of one or more control output membership functions. More specifically, if the $e_{gp} = +0.3$ and $\Delta e_V = 0.15$, the $e_{gp}$ signals can be classified both as ZE and PS sensed bearing error linguistic variables based upon the x1 or $e_{gp}$ membership function set of FIG. 4A while the $\Delta e_V$ signal is encoded into ZE and PS sensed error rate linguistic variables based upon the x2 or $\Delta e$ membership function set of FIG. 4B.

Assuming that the sign is positive, FIG. 6A discloses that the rule based unit 34 will correlate each of the possible four input combinations as follows:

IF $e_{gp}$ is ZE AND $\Delta e_V$ is ZE THEN $\Delta C$ is ZE.
IF $e_{gp}$ is ZE AND $\Delta e_V$ is PS THEN $\Delta C$ is NS.
IF $e_{gp}$ is PS AND $\Delta e_V$ is ZE THEN $\Delta C$ is NS.
IF $e_{gp}$ is PS AND $\Delta e_V$ is PS THEN $\Delta C$ is NM.

Thus in step 45 the rule based unit 34 produces different output consequences or control output linguistic variables derived from these selected rules.

Then a summing circuit 46, symbolically referenced in FIG. 5, essentially combines each of the output variable membership functions corresponding to each of the selected control output linguistic variables to produce an output signal as shown by steps 47 and 63 in FIG. 3B. More specifically, the summing circuit 46 in FIG. 5 combines the selected control output membership functions scaled by the various sensed variable signals as illustrated in FIGS. 7A through 7E which depict each of the four previously identified input combinations and correlations. During the selection of the sensed linguistic variables, the fuzzification unit 33 correlates each of the sensed variable signals to a particular point on a corresponding encoding sensed variable membership function. This correlation provides scaling for each control output membership function through the selection of the lower of the intercepts of the input signals with the corresponding sensed variable membership functions incorporated in the specific rule.

For example, in the case of the first rule shown in FIG. 7A, an intersection 47 of the $\Delta e_V$ signal with ZE membership function is lower than the intersection 50 of the $e_{gp}$ signal with its selected ZE membership function, so the $\Delta e_V$ signal controls the magnitude of the selected ZE control output membership function by establishing a scaled triangular output function 51 with its peak at intersection 52 rather than the intersection 53. In a similar fashion, the second rule depicted in FIG. 7B produces a triangular form 54 based upon an intersection 55 of the $e_{gp}$ signal with the ZE sensed variable membership function that is lower than an intersection 56 of the $\Delta e_V$ signal with its corresponding PS membership function. Similarly the rules depicted in FIGS. 7C and 7D provide triangular forms 57 and 58 respectively based upon a lower intersection 60 of the $\Delta e_V$ signal in FIG. 7C and upon a lower intersection 61 of the $e_{gp}$ signal in FIG. 7D.

Stated mathematically, the inferred control output functions from each of the identified rules are, respectively, (1) $\zeta_{(1)} \mu^4_{\Delta C}$, (2) $\zeta_{(2)} \mu^3_{\Delta C}$, (3) $\zeta_{(3)} \mu^3_{\Delta C}$ and (4) $\zeta_{(4)} \mu^2_{\Delta C}$ where:

$\zeta_{(1)}\mu^4{}_{\Delta C}=\mu(\Delta C)_{(1)}=$ the control output function for rule 1 defined by $\mu^4{}_{\Delta C}$ multiplied by the value $\zeta_{(1)}$; and $\zeta_{(2)}\mu^3{}_{\Delta C}=\mu(\Delta C)_{(2)}=$ the control output function for rule 2 defined by $\mu^3{}_{\Delta C}$ multiplied by the value $\zeta_{(2)}$.

$\zeta_{(3)}\mu^3{}_{\Delta C}=\mu(\Delta C)_{(3)}=$ the control output function for rule 3 defined by $\mu^3{}_{\Delta C}$ multiplied by the value $\zeta_{(3)}$; and $\zeta_{(4)}\mu^2{}_{\Delta C}=\mu(\Delta C)_{(4)}=$ the control output function for rule 4 defined by $\mu^2{}_{\Delta C}$ multiplied by the value $\zeta_{(4)}$; and $$\zeta_{(1)}=Y^4{}_{x1}\wedge Y^3{}_{x2}=\min(Y^4{}_{x1}, Y^3{}_{x2}) \quad (24)$$

$$\zeta_{(2)}=Y^4{}_{x1}\wedge Y^4{}_{x2}=\min(Y^4{}_{x1}i, Y^4{}_{x2}) \quad (25)$$

$$\zeta_{(3)}=Y^5{}_{x1}\wedge Y^3{}_{x2}=\min(Y^5{}_{x1}i, Y^3{}_{x2}) \quad (26)$$

$$\zeta_{(4)}=Y^5{}_{x1}\wedge Y^4{}_{x2}=\min(Y^5{}_{x1}i, Y^4{}_{x2}) \quad (27)$$

where $Y_{xj}{}^i$ is $\mu_{xj}{}^i$ evaluated at a specific sensed input xj (t) at time "t" and where "$\zeta$" denotes a fuzzy minimum. The control output composite implication function, $\mu(\Delta C)$, of the rule-based unit for this example is expressed as:

$$\mu(\Delta C)=\mu(\Delta C)_{(1)}+\mu(\Delta C)_{(2)}+\mu(\Delta C)_{(3)}+\mu(\Delta C)_{(4)} \quad (28)$$

As previously indicated, the ruled based unit 34 in FIGS. 2 and 5 also operates in accordance with step 63 of FIG. 3B by combining the scaled fuzzy output membership functions shown in FIGS. 7A through 7D into a composite output function as shown in FIG. 7E that is acceptable for use in the defuzzification unit 35. A number of methods can be utilized for converting composite outputs into guidance commands in step 64. The defuzzification unit 35 uses a centroid method to provide guidance commands. Mathematically the centroid is computed as follows:

$$\Delta C = \frac{\Sigma_k[(\zeta_{(k)}C_{\Delta C(k)}I_{\Delta C(k)}]}{\Sigma_k\zeta_{(k)}I_{\Delta C(k)}} \quad (29)$$

where $\Sigma_{(k)}$ is the summation over all the rules selected by the rule based unit 34 and $I_{\Delta C(k)}$ and $C_{\Delta C(k)}$ are the respective area and centroid of the kth rule consequent set membership function. This is represented in FIG. 7E that depicts the superposition of the scaled control output membership functions of FIGS. 7A through 7D. The resulting or composite output function is the sum of the selected control output functions shown in FIGS. 7A through 7D. This composite function includes the area between a dashed line 59 plus the sides 58A and 51A of the functions 58 and 51, respectively, from the dashed line 59. The defuzzification unit 35 calculates the centroid for the function shown in FIG. 7E to produce a resulting $\Delta C$ signal that is the finite signal for controlling the torpedo 10 in FIG. 1.

Figure 8:
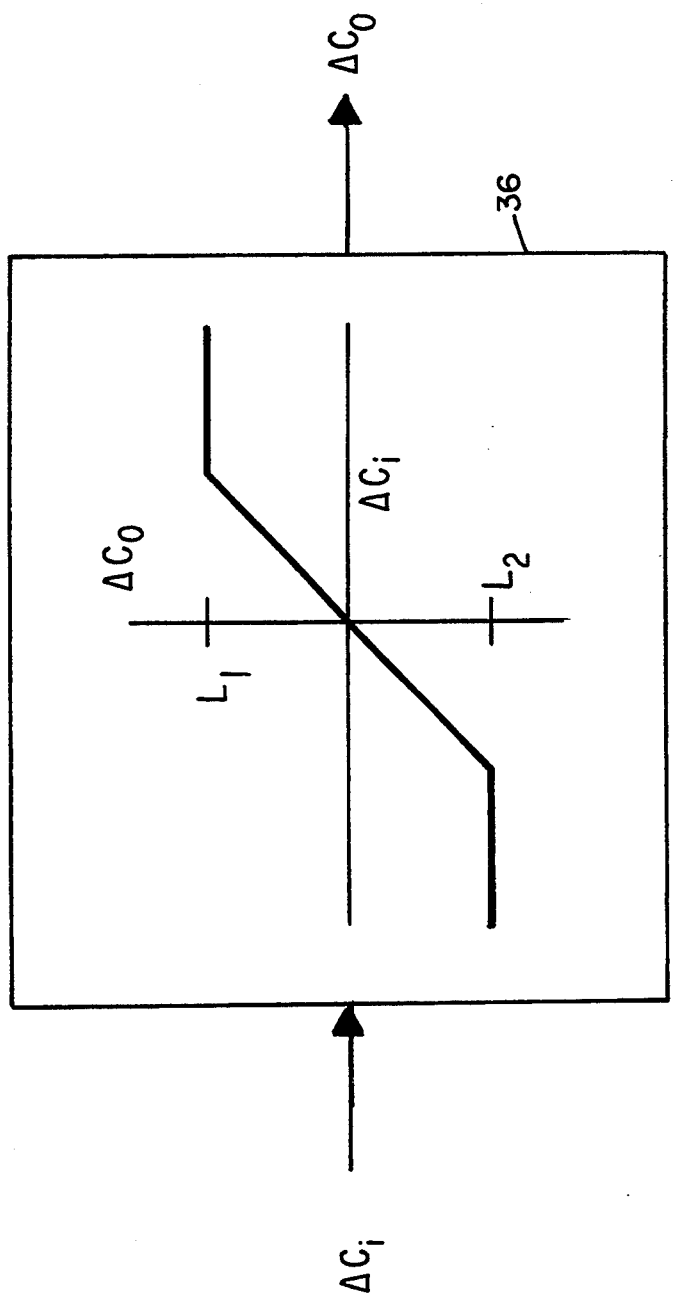
FIG. 8 graphically represents the operation of a constraint unit shown in FIG. 2.

In some situations, particularly where the launcher 11 and target 12 undergo independent motion, it may be desirable to constrain these control actions. For example, it is desirable to assure that the torpedo is not moved into a position whereby it has a searching velocity vector component directed back to the launcher 11. The constraint unit 36 in FIG. 2 tests the guidance command against various limits as indicated in step 65 in FIG. 3B. Essentially the constraint unit 36 interrogates each control command from the defuzzification unit 35 to determine if this command will cause the torpedo 10 to exceed any limits that are governed by a particular circumstance. FIG. 8 graphically represents one set of limits. In terms of the specifically disclosed embodiment described above, these limits can be defined mathematically, assuming there is no initial vehicle velocity component toward the launcher, as follows:

$$L_1 = B_v + 90° - (C_{Vm})_{k-1} \quad (30)$$

and $$L_2 = B_v - 90° - (C_{vm})_{k-1} \quad (31)$$

where $(C_{vm})_{k-1}$ is the vehicle course from the last update cycle.

If the limit is defined as shown in FIG. 8 and is exceeded, only that portion of the command that produces a course perpendicular to the torpedo bearing line between the launcher 11 and torpedo 10 in FIG. 1 will be utilized. In the specific application of a torpedo launched from a submarine, these limits ensure that the trajectory of the torpedo from the addition of various system commands does not produce a velocity component toward the launcher 11 in its then current position.

After the control system 22 generates its command signal subject to the constraint unit 36, the communications link 23 transfers the command signal over the communications channel 24 to the communications link 25 in step 66 of FIG. 3B. The guidance system 26 responds to any command requiring a course alteration by changing the path of the torpedo 10 so as to maintain a beam rider trajectory.

Figure 9A:
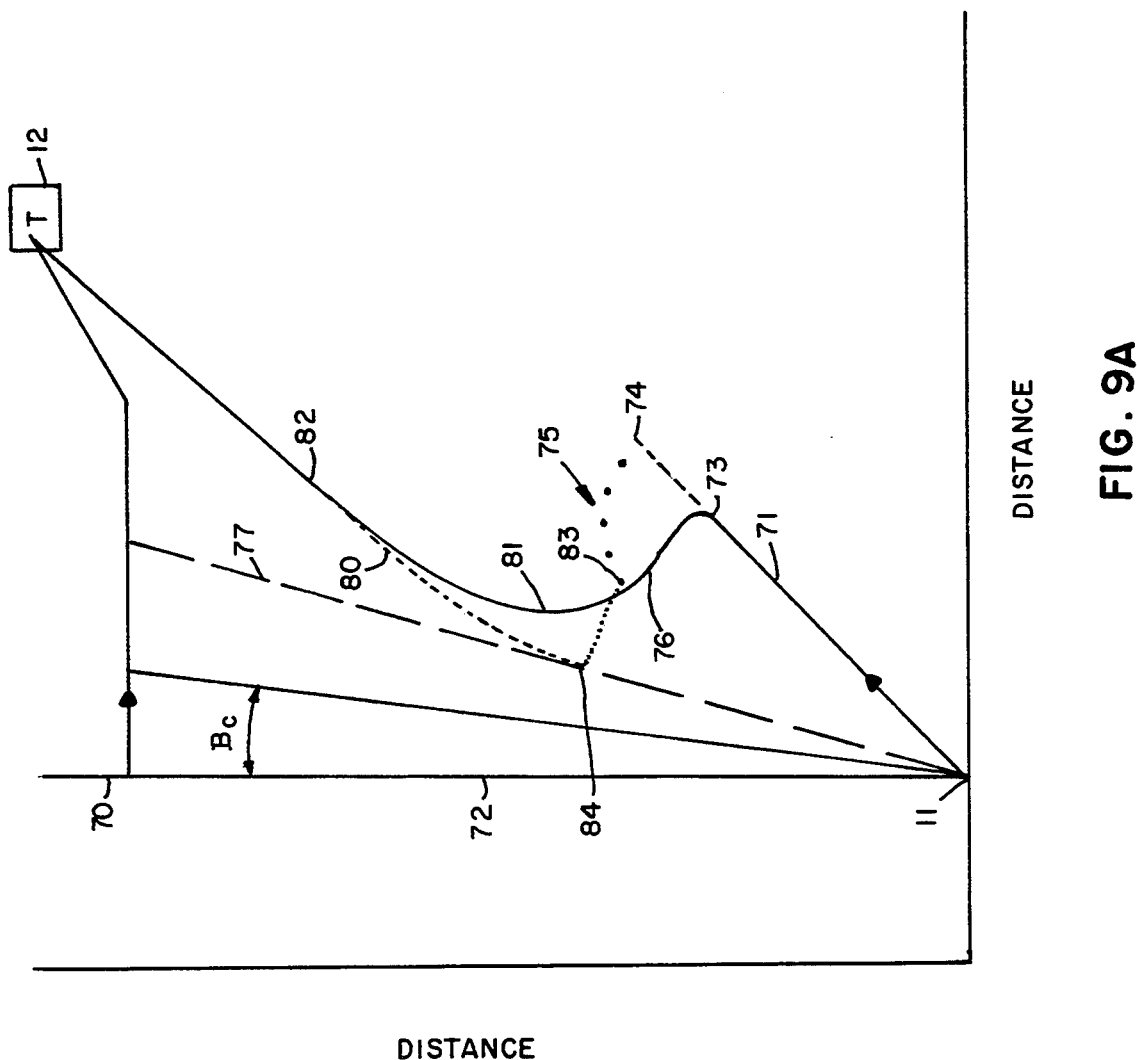

FIG. 9A depicts a sample trajectory of a torpedo 10 as it moves from a launcher 11 represented at position 11 to a moving target 12. In this particular example it is assumed that the launcher is stationary, that target tracking commenced at a position 70 and that the torpedo 10 was launched along a track 71 essentially at 45° to the initial bearing line 72. In accordance with accepted procedures the torpedo initially advances along the track 71 independently of the control system in FIG. 2. The guidance system 16 in FIG. 2 takes control of the torpedo at position 73.

When the torpedo is at the position 73, its guidance point is at the position 74. In this graph, each dot represents one sample cycle. As the control system takes over, it applies controls that move the guidance point through a series of positions 75 until the torpedo track is essentially 90° to the current torpedo bearing. Thereafter, successive samples may attempt to move the guidance point further, but the constraint unit 36 prevents any velocity component back toward the launching vessel 11. Consequently the torpedo proceeds along a path that is always at right angles to the bearing line between the launching vessel 11 and the torpedo 10. A resulting track 76 lies on an arcuate path with a constant radius when the launching vessel 11 is stationary.

As the target is moving from position 70 to the right, the control system attempts to direct the torpedo 10 thereby to place its guidance point on the bearing to the target. Referring to this operation in more detail, the control circuit in FIG. 2 takes control at a point 73 during the trajectory shown in FIG. 9A. This is at a time $t_i=0$ represented in both FIGS. 9B and 9C that depict the time variations of the $e_{gp}$ and $\Delta e_V$ signals. As shown in FIG. 9B, the initial bearing error $e_{gp}$ is greater than 30°. The control system 22 produces commands which result in a maximum counterclockwise turn as shown by the guidance point movement over the interval as the guidance point moves to position 83. The value of the error then reduces further at a different slope between points 83 and 84 on the graph of FIG. 9B while the $\Delta e_V$ signal remains constant in FIG. 9C.

Figure 9C:
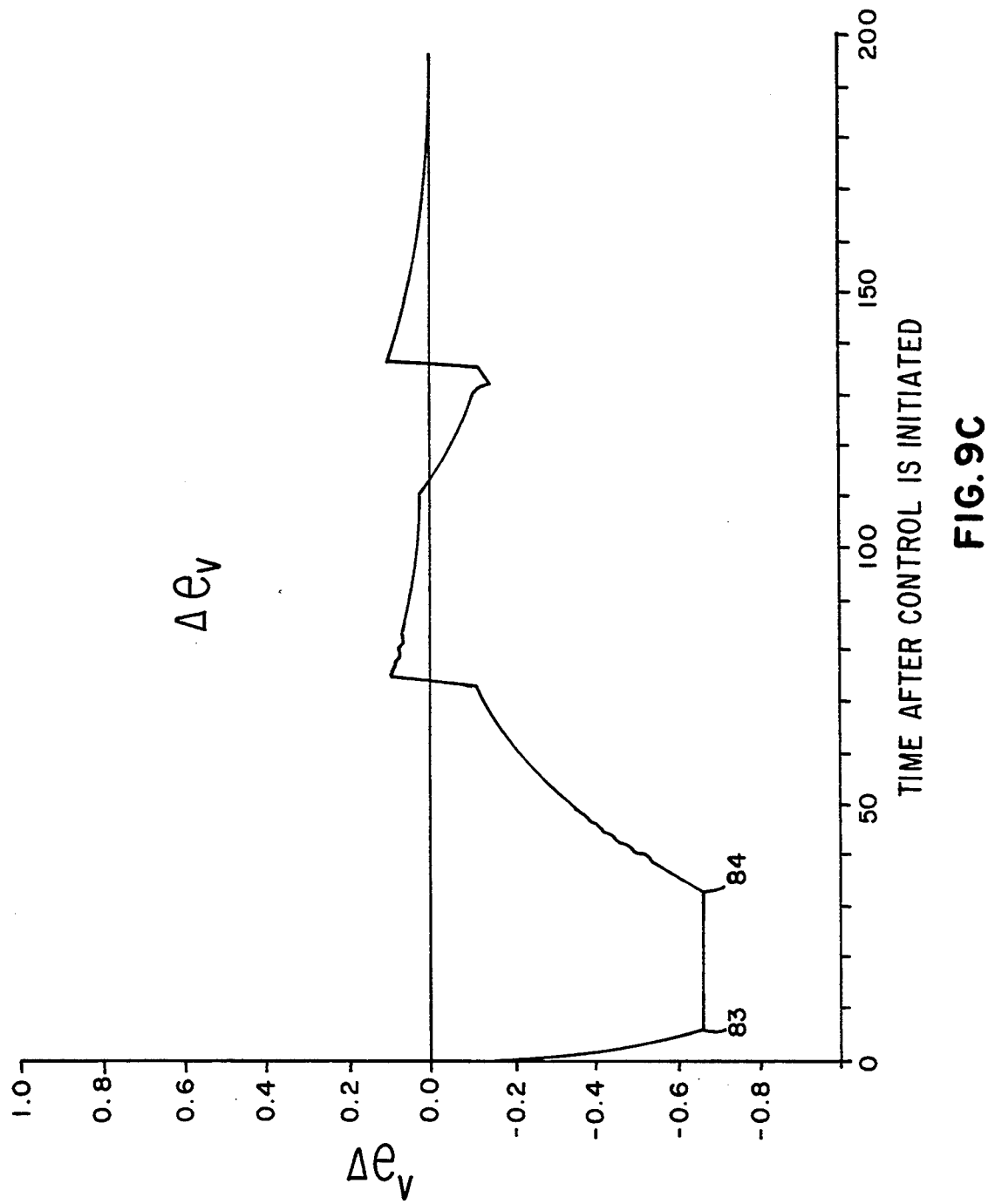

As the guidance point approaches the bearing line, the $e_{gp}$ signal reaches an essentially zero value at point 84. The guidance system 16 continues to issue the commands required to maintain the guidance point on the beam rider trajectory for the remainder of the torpedo's travel toward the target 12. Referring to FIG. 9C, the $\Delta e_V$ signal remains at a constant rate through point 84 under the control of the constraint unit 36. The constraint unit 36 stops overriding commands at point 84. After point 84, the bearing error signal remains at an essentially zero value. In this specific scenario with a maneuvering target 12, the bearing error rate signal may initially go through a zero crossing as shown in FIG. 9C and then decrease toward zero. Then it will continue to move back and forth across the zero point indicating changes in the error direction. However, as shown in FIGS. 9A and 9B, the guidance point does remain on the bearing line to the target while the torpedo proceeds toward the target 12.

Thus in accordance with this invention, a guidance system 16 as shown in FIG. 2 combines a contact bearing, a torpedo guidance point bearing and a torpedo bearing to form a guidance point bearing error and to determine from other information available to the system the sign of and the difference between the contact bearing and the vehicle bearing. These signals are sampled on a regular iterative basis, so data from two successive sets of signals also provides the rate of change of the angle between the contact bearing and the torpedo bearing. The fuzzification unit 33 uses corresponding sensed variable membership functions to encode each of the inputs obtained during one iteration into one or more sensed linguistic variables. A rule-based unit 34 converts these selected sensed linguistic variables into one or more control output linguistic variables that correspond to control output membership functions of a control output membership function set that then can be combined by diverse procedures to obtain a control signal. A constraint prevents the control unit 22 from directing the objects such as a torpedo in an inappropriate direction.

As is apparent, this control system 22 emulates operations that reflect heuristic considerations through the utilization of a rule-based expert system that is contained in the matrices of FIGS. 6A and 6B and that operates with linguistic variables. This system includes knowledge based upon specific experimental data and the experience of individuals. Moreover, the constraint unit 36 provides information on the current situation to prevent unwanted effects caused by the forwarding of any command.

This invention has been described in terms of block diagrams, processes and graphical analysis that will enable anyone of ordinary skill in control systems art to construct a specific embodiment of such a control system. It will be apparent that many modifications can be made to the disclosed apparatus without departing from the invention. Therefore, it is the intent of the appended claims to cover all such variations and modifications as come within the true spirit and scope of this invention.

What is claimed is:

1. A system for guiding a steerable object in motion from a first site toward a second site comprising:

sensing means for generating first and second sensed variable signals corresponding to bearings from the first site to the steerable object and from the first site to the second site;

first storage means for storing first and second sets of sensed linguistic variables;

second storage means for storing at least one of a set of control output linguistic variables;

first selection means for selecting at least one of the sensed linguistic variables from each of the sets in said first storage means in response to the first and second sensed variable signals;

second selection means responsive to the selected sensed linguistic variables for producing a control output based upon the selection of at least one of a set of control output linguistic variables;

means for generating a guidance command for controlling the steerable object in response to the control output from said second selection means; and means for transferring the guidance command to the steerable object.

2. A guidance system as recited in claim 1 wherein said first storage means stores first and second sets of sensed variable membership functions and said first selection means selects sensed linguistic variables based upon the sensed variable signals and sensed variable membership functions.

3. A guidance system as recited in claim 2 wherein said sensing means additionally includes means for determining the difference between the sensed bearing signals and the rate of change of the bearing signals difference and wherein said first and second sensed linguistic variables and membership function sets correspond to the difference in the bearing signals and the rate of change in the difference of the bearing signals.

4. A guidance system as recited in claim 3 wherein said steerable object includes a guidance point spaced a predetermined distance from the steerable object along its longitudinal axis of motion and said sensing means produces bearings to said object and to said guidance point, said difference means taking the bearing signal difference as the difference between the bearing to the guidance point and the bearing to the second site and taking the rate of change as the rate of change of the difference between the bearing to the object and the bearing to the second site.

5. A guidance system as recited in claim 4 wherein said determining means additionally includes means for generating a bearing error signal corresponding to the bearing signal difference and a rate of change error signal corresponding to the rate of change of the differences between the bearings to the object and to the second site.

6. A guidance system as recited in claim 5 wherein said first sensed variable membership set provides first sensed variable membership functions for values of the bearing error and said second sensed variable membership function set provides second sensed variable membership functions for values of the rate of change of the error signal.

7. A guidance system as recited in claim 6 wherein said first selection means assigns a value to selected sensed linguistic variables in response to the magnitude of the sensed variable signals.

8. A guidance system as recited in claim 2 wherein said second storage means stores a set of control output membership functions and said second selection means combines the sensed linguistic variables to produce at least one corresponding control output linguistic variable and produces the control output based upon the control output membership functions corresponding to the at least one control output linguistic variable.

9. A guidance system as recited in claim 8 wherein said second selection means includes means for selecting a control output linguistic variable according to a set of logical rules.

10. A guidance system as recited in claim 9 wherein said first selection means assigns a value to each selected sensed linguistic variable in response to the magnitude of said first and second sensed variable signals and said second selection means scales each control output membership function in response to the assigned value.

11. A guidance system as recited in claim 10 wherein said guidance command generating means includes means for combining a plurality of scaled output control membership functions into a guidance command.

12. A guidance system as recited in claim 11 wherein said guidance command generating means additionally comprises constraint means for limiting the range of guidance commands from said guidance command generating means.

13. A guidance system as recited in claim 1 wherein said guidance command generating means additionally comprises constraint means for limiting the range of guidance commands from said guidance command generating means.

14. A guidance system as recited in claim 1 wherein said first storage means stores first and second sets of sensed variable membership functions and said first selection means selects sensed linguistic variables based upon the sensed variable signals and sensed variable membership functions and wherein said second storage means stores a set of control output membership functions and said second selection means combines the sensed linguistic variables to produce at least one control output linguistic variable and produces the control output based upon the control output membership functions corresponding to the at least one control output linguistic variable.

15. A guidance system as recited in claim 14 wherein said first selection means includes means for selecting a plurality of sensed linguistic variables from each of said first and second sets of sensed linguistic variables and said second 16. A guidance system as recited in claim 15 wherein said guidance command generating means includes means for obtaining the centroid of the combined control output membership functions.

17. A guidance system as recited in claim 15 wherein said first selection means assigns a value to each selected sensed linguistic variable and said guidance command generating means includes means for scaling each said selected control output membership function by a scaling factor corresponding to the assigned values.

18. A guidance system as recited in claim 17 wherein said guidance command generating means includes means for combining said scaled control output membership functions according to a centroid method.

19. A method that responds to guidance commands from a first site for guiding a steerable object to a second site comprising the steps of:
iteratively sensing bearings from the first site to the steerable object and from the first site to the second site;
selecting, for each set of sensed bearings, at least one of a set of predetermined sensed linguistic variables in sets thereof;
selecting in response to the selected sensed linguistic variables at least one control output linguistic variable from a predetermined set of control output linguistic variables;
generating a guidance command for controlling the steerable object in response to the control output linguistic variables selection; and
transferring the guidance command to the steerable object.

20. A method as recited in claim 19 wherein said selection of sensed linguistic variables includes using the sensed bearings and sets of sensed variable membership functions for selecting the sensed linguistic variables and wherein said generation of said guidance command includes using the selected control output linguistic variables to select corresponding control output membership functions and combining the selected control output membership functions to produce a control output.

21. A method as recited in claim 20 wherein said step of iteratively sensing bearings includes the steps of generating a first sensed variable signal corresponding to the difference in the bearings to the steerable object and the second site and generating a second sensed variable signal corresponding to a rate of change between the difference in the bearings to the steerable object and the second site, said first and second sensed variable signals being classified as one of a plurality of linguistic variables in a sensed linguistic variable set.

22. A method as recited in claim 20 wherein the steerable object has forward motion and has a first location thereon and a second location spaced from and ahead of the steerable object along a longitudinal axis of motion therethrough, said step of iteratively sensing bearings further including the steps of generating a first bearing signal to the first location, a second bearing signal to the second location and a third bearing signal to the second site, said sensing step additionally including generating a guidance point error signal corresponding to the difference between the second and third bearing signals and a rate of change error signal corresponding to the rate of change of the differences between the first and third bearing signals.

23. A method as recited in claim 22 additionally comprising the step of determining a sign for the difference between the first and third signals.

24. A method as recited in claim 23 wherein the first and second sensed linguistic variables and associated function sets correspond to the guidance point error signal and rate of change error signal respectively and each has a fixed plurality of members corresponding to different values of the corresponding sensed linguistic variables, each of said members being programmable to vary a classification of a given value of a sensed variable signal.

25. A method as recited in claim 23 wherein the first and second sensed linguistic variables and associated membership function sets correspond to the guidance point error signal and rate of change error signal respectively and each has a fixed plurality of linguistic variables and associated membership functions corresponding to different values of the corresponding sensed linguistic variables, each of said sensed variable membership functions being programmable to vary a classification of a particular value of a sensed variable signal, said sensed variable membership functions being overlapped whereby the classification of certain values of a sensed variable signal produce a selection of plural sensed linguistic variables.

26. A method as recited in claim 25 wherein said selection of a control output linguistic variable and associated membership function is made according to a predetermined number of logical rules based upon selected individual sensed linguistic variables.

27. A method as recited in claim 26 wherein said selection of a control output linguistic variable and associated membership function additionally includes the steps of identifying a plurality of control output linguistic variables and associated control output membership functions from the control output membership function set in response to multiple logical rules and of combining said control output membership functions to produce the control output.

28. A method as recited in claim 27 wherein said step of combining control output membership functions includes scaling the selected control output membership functions in response to the magnitudes of the sensed variable signals.

29. A method as recited in claim 28 wherein said guidance command generating step includes combining the multiple scaled controlled output membership functions into the guidance command.

30. A method as recited in claim 29 wherein said guidance command generating step includes the step of testing the guidance command against predetermined limits thereby to constrain the resulting guidance command.

31. A method as recited in claim 20 wherein said guidance command generating step includes the step of testing the guidance command against predetermined limits thereby to constrain the guidance command.

32. A method as recited in claim 20 wherein the first and second sensed linguistic variables and associated membership function sets correspond to a guidance point error signal and rate of change error signal respectively and each has a fixed plurality of sensed linguistic variables and membership functions corresponding to different values of the corresponding sensed variables, at least one of said membership functions overlapping another membership function whereby the sensed variable can select multiple sensed linguistic variables in a given sensed linguistic variable set and wherein said selection of multiple sensed linguistic variables additionally includes the steps of identifying a plurality of control output linguistic variables and associated membership functions in response to multiple rules and of combining the selected control output membership functions for subsequent conversion to a guidance command.

33. A method as recited in claim 32 wherein said guidance command includes the summation of the selected control output membership functions by a centroid weighted method.

34. A method as recited in claim 33 wherein each selected sensed variable membership function produces a scaling factor in response to the magnitude of the corresponding sensed variable signal and wherein each selected control output membership function is scaled by an amount corresponding to the minimum scaling factor value of the corresponding sensed linguistic variable signal producing the control output membership function.

* * * * *